(12) United States Patent
Walston et al.

(10) Patent No.: US 11,041,394 B2
(45) Date of Patent: Jun. 22, 2021

(54) CMC AIRFOIL JOINT

(71) Applicants: Rolls-Royce Corporation, Indianapolis, IN (US); Rolls-Royce plc, London (GB)

(72) Inventors: Jeffrey A. Walston, Indianapolis, IN (US); Michael Whittle, Derby (GB); Daniel K. Vetters, Indianapolis, IN (US); Eric Koenig, Fishers, IN (US)

(73) Assignees: Rolls-Royce Corporation, Indianapolis, IN (US); Rolls-Royce plc

( * ) Notice: Subject to any disclaimer, the term of this patent is extended or adjusted under 35 U.S.C. 154(b) by 183 days.

(21) Appl. No.: 15/995,773

(22) Filed: Jun. 1, 2018

(65) Prior Publication Data

US 2019/0368363 A1 Dec. 5, 2019

(51) Int. Cl.
*F01D 9/04* (2006.01)
*F01D 25/00* (2006.01)

(52) U.S. Cl.
CPC ............ *F01D 9/044* (2013.01); *F01D 25/005* (2013.01); *F05D 2230/10* (2013.01); *F05D 2230/60* (2013.01); *F05D 2300/6033* (2013.01)

(58) Field of Classification Search
CPC .......... F01D 9/044; F01D 25/005; F01D 5/14; F01D 5/147; F01D 5/284; F01D 5/3084; F01D 9/042; B32B 18/00; C04B 37/00; C04B 37/001; F05D 2230/10; F05D 2230/60; F05D 2300/6033; F05D 2240/80

USPC ....................................................... 415/200
See application file for complete search history.

(56) References Cited

U.S. PATENT DOCUMENTS

| | | | |
|---|---|---|---|
| 5,797,725 A | 8/1998 | Rhodes | |
| 6,648,597 B1 | 11/2003 | Widrig et al. | |
| 7,722,317 B2 | 5/2010 | Schiavo et al. | |
| 8,454,303 B2 | 6/2013 | Garcia-Crespo | |
| 8,475,895 B2* | 7/2013 | Xie | F01D 25/005 428/34.5 |
| 8,956,112 B2 | 2/2015 | Tanahashi et al. | |
| 9,068,464 B2 | 6/2015 | Morrison et al. | |
| 9,726,028 B2 | 8/2017 | Marra et al. | |
| 9,863,260 B2 | 1/2018 | Weaver | |
| 2005/0254942 A1* | 11/2005 | Morrison | C04B 37/005 415/200 |
| 2016/0047257 A1 | 2/2016 | Radomski et al. | |
| 2016/0222800 A1* | 8/2016 | Kleinow | F01D 5/284 |
| 2016/0265384 A1 | 9/2016 | Walston et al. | |
| 2018/0030840 A1 | 2/2018 | Freeman et al. | |
| 2019/0063246 A1* | 2/2019 | Frey | C04B 35/571 |
| 2019/0338660 A1* | 11/2019 | Underwood | F01D 25/12 |

* cited by examiner

*Primary Examiner* — Brian P Wolcott
*Assistant Examiner* — Justin A Pruitt
(74) *Attorney, Agent, or Firm* — Barnes & Thornburg LLP (57) ABSTRACT

Joining an airfoil with a platform by mechanical keying can provide advantages in applications of ceramic materials, such as ceramic matrix composites.

18 Claims, 7 Drawing Sheets

CMC AIRFOIL JOINT

BACKGROUND

The present disclosure relates generally to components for turbomachinery, and more specifically to high temperature components for turbomachinery such as gas turbine engines.

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

To withstand heat from the combustion products received from the combustor, the engine may include airfoil structures made from ceramic-matrix composite materials that are able to interact with the hot flows, such as combustion products. In some vane assemblies, the vane may be coupled with a platform to guide the flow across the vane. Coupling between the airfoils and platforms made from ceramic-matrix composite materials can present design challenges.

SUMMARY

The present disclosure may comprise one or more of the following features and combinations thereof.

According to an aspect of the present disclosure, an airfoil assembly of a gas turbine engine may include a vane including a body formed to have an airfoil surface for passage of pressurized flow through the gas turbine engine, a platform defining a flow path surface for guiding pressurized flow through the gas turbine engine, the platform extending circumferentially from a radial end of the vane relative to the gas turbine engine, and a joint assembly securing the vane with the platform. The joint assembly may include at least a portion of one of the vane and the platform formed as a positive contour and captured within a complimentary space of the other of the vane and platform.

In some embodiments, the positive contour may project from the wall of one of the body of the vane and a wall of the platform for insertion into the complimentary space of the other of the vane and the platform. In some embodiments, the positive contour may be formed of a number of fibers each terminating at a termination end arranged within the opening of the complimentary space.

In some embodiments, the positive contour may be formed on the vane and the termination end of each fiber may be arranged laterally outward of the airfoil surface for arrangement within the complimentary opening.

In some embodiments, at least one of the number of fibers may include a darted portion formed at an intersection between a section of the fiber forming the positive contour and a remainder of the at least one fiber. The section of the fiber forming the positive counter may extend laterally outward from the intersection. The section of the fiber forming the positive counter may extend laterally outward at angle in the range of 15 to 95 degrees relative to the airfoil surface near the intersection.

According to another aspect of the present disclosure, an airfoil assembly of a gas turbine engine may include an airfoil including a body formed to have an airfoil surface for passage of pressurized flow through the gas turbine engine, a platform defining a flow path surface for guiding pressurized flow through the gas turbine engine, the platform extending circumferentially from a radial end of the airfoil relative to the gas turbine engine, and joint means for securing the airfoil with the platform to guide pressurized flow through the gas turbine engine.

In some embodiments, the joint means may include a positive contour projecting from the wall of one of the body of the airfoil and a wall of the platform for insertion into a complimentary space of the other of the vane and the platform. The positive contour may be formed of a number of fibers. The number of fiber may each terminate at a termination end arranged within the opening of the complimentary space.

In some embodiments, the positive contour may be formed on the airfoil and the termination end of each fiber may be arranged laterally outward of the airfoil surface for arrangement within the complimentary opening. In some embodiments, at least one of the number of fibers may include a darted portion formed at an intersection between a section of the fiber forming the positive contour and a remainder of the at least one fiber. In some embodiments, the section of the fiber forming the positive counter may extend laterally outward from the intersection. In some embodiments, the section of the fiber forming the positive contour may extend laterally outward at angle in the range of 15 to 95 degrees relative to the airfoil surface near the intersection.

According to another aspect of the present disclosure, a method of assembling a CMC airfoil of a gas turbine engine may include arranging termination ends of a number of fibers of a positive contour of one of a vane and a platform within a complimentary space of the other of the vane and the platform.

In some embodiments, the method may further include machining the positive contour leaving at least one of the number of fibers exposed. In some embodiments, machining may be performed after chemical vapor infiltration. In some embodiments, machining may be performed after slurry infiltration and/or after melt infiltration. In some embodiments, the termination ends may be arranged laterally outward from an airfoil surface of the vane.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
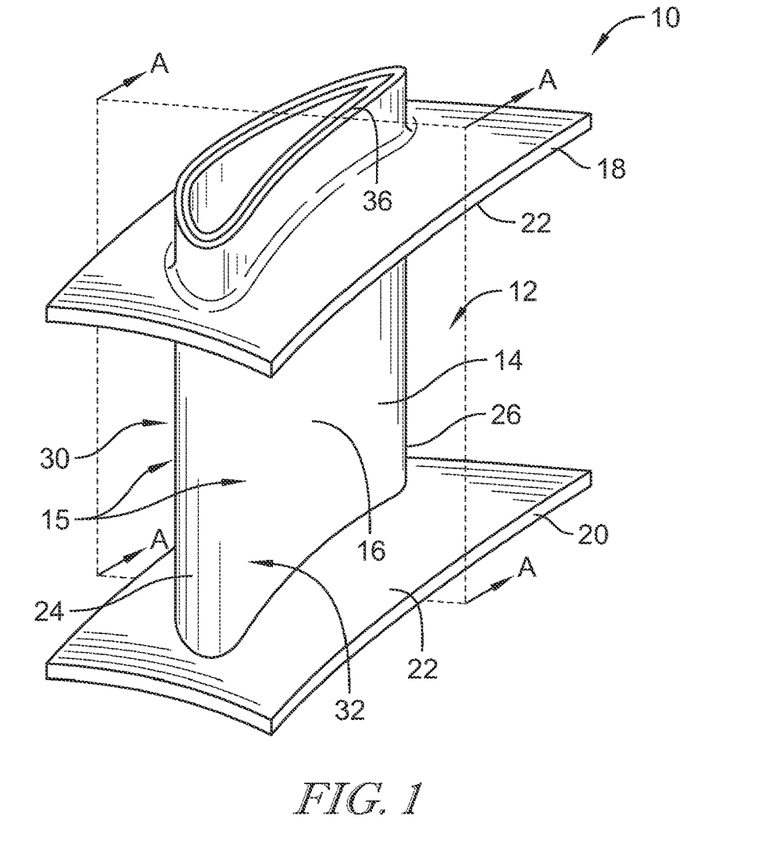
FIG. 1 is a perspective view of an airfoil assembly comprising ceramic materials for use in a gas turbine engine showing that the assembly includes an airfoil body having pressure and suction side for guiding pressurized flow through the gas turbine engine and inner and outer platforms receiving radially inner and outer ends of the airfoil body for connection to provide radial gas flow path surfaces to direct the pressurized flow to pass over the airfoil body.

Ceramic materials, such as fiber-reinforced ceramic matrix composites, can be applied in gas turbine engine components to achieve weight reductions while maintaining good tolerance to the high temperature environments of the engine. An illustrative airfoil assembly 10 including ceramic materials is shown in FIG. 1 adapted for use in a gas turbine engine. The airfoil assembly 10 includes airfoil 12 embodied as a vane. The airfoil 12 comprises a body 14 defining an airfoil shape by its exterior surface 16 for guiding pressurized flow (illustrated by arrows 15) through the gas turbine engine. The airfoil body 14 of the illustrative airfoil assembly 10 extends radially (up and down in FIG. 1) relative to a central rotating axis of the gas turbine engine, and includes a leading edge 24 disposed upstream and trailing edge 26 disposed downstream, and a pressure side 30 and suction side 32 for guiding the pressurized flow. The assembly 10 illustratively includes endwalls 18, 20 formed as platforms each having a flow path surface 22 which defines the radial boundary of the primary flow path across the airfoil 12.

Figure 2:
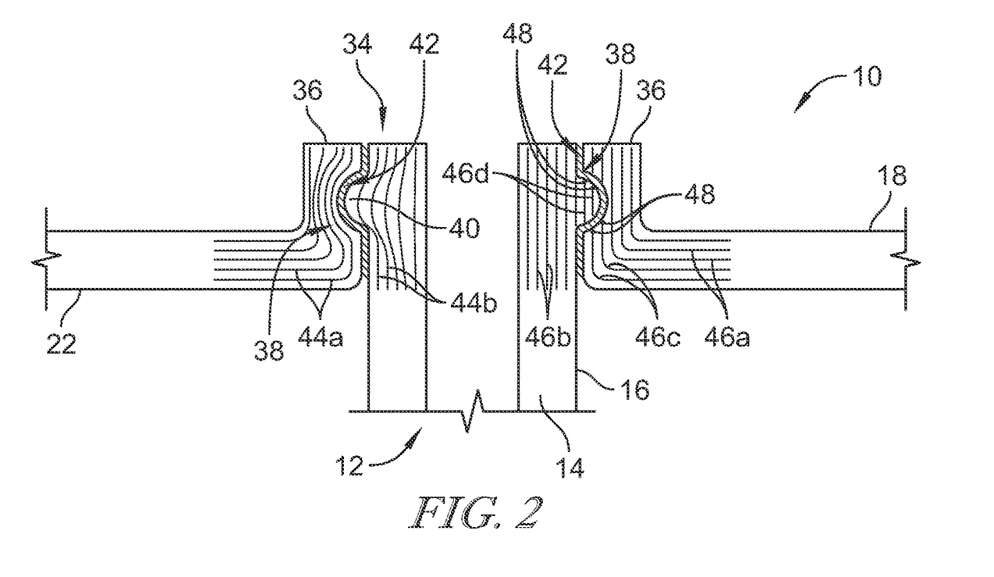
FIG. 2 is a cross-section view taken along the plane A-A in FIG. 1 showing that the platforms are connected with the airfoil body by a joint assembly including a positive contour formed to project outward from the airfoil body which is received within a complimentary space defined by the platform, and showing on the left hand side a first construction of reinforcement fibers arranged to have curvature to create the positive contour and the complimentary space, and on the right hand side another construction of the fibers receiving machining to define the positive contour and the complimentary space such that terminal ends of a number of the fibers of the positive contour are arranged within the complimentary space.

Referring to the FIG. 2, the upper endwall 18 is shown in additional detail to illustrate its connection with the airfoil 12. The illustrative endwall 18 defines a receiving hole 34 for receiving a radial end of the airfoil 12 for connection. The endwall 18 includes a rim 36 formed as a wall that extends circumferentially about the airfoil 12 to define the receiving hole 34. A joint assembly 38 is formed to secure the endwall 18 with the airfoil 12.

The joint assembly 38 is illustratively formed by reception of a positive contour 40 within a complimentary space 42. In the illustrative embodiment of FIG. 2, the positive contour 40 is formed by the airfoil 12 and the complimentary space 42 is formed by the endwall 18. Each of the positive contour 40 and complimentary space 42 are illustratively embodied to be formed along the circumference of the receiving hole 34, but in some embodiments, may be formed to include one or more non-continuous sections of the circumference of the receiving hole 34. Two distinct constructions are disclosed in FIG. 2 on the left and right hand sides of the cross-section as illustrated by the arrangement of fibers 44, 46 having matrix material infused thereon.

On the left hand side of FIG. 2, a formed construction is shown including fibers 44a,b which extend through the respective endwall 18 or airfoil 12. The fibers 44a, 44b are formed to have contouring to collectively define (or build) their portion of the joint assembly 38. For example, the fibers 44a of the endwall 18 are arranged with curvature to collectively define a concavity as the complimentary space 42. Outward (leftward in FIG. 2) of the complimentary space 42, the fibers 44a illustratively extend along the lateral extent of the endwall 18. Similarly, the fibers 44b of the airfoil 12 are arranged with curvature to collectively define the positive contour 40 for reception within the complimentary space 42. Radially inward (downward in FIG. 2) of the positive contour 40, the fibers 44b illustratively extend along the radial (vertical) extent of the body 14 of the airfoil 12. In this manner the fibers of the endwall 18 and airfoil 12 are arranged to define the joint assembly 38 itself.

On the right hand side of FIG. 2, a machined construction of components is shown including fibers 46a,b which extend through the respective endwall 18 or airfoil 12. The fibers 46a, 46b are formed to have contouring merely to define their portion of the endwall 18 or airfoil 12, and the joint assembly 38 has been machined into the component parts. For example, the fibers 46a of the endwall 18 are arranged generally vertically to define the rim 36 and with curvature merely to turn and continue laterally (rightward) to define the remainder of the endwall 18.

The fibers 46b include a number of fibers 46c which have received machining to form the complimentary space 42 as illustrated by the space 42 breaking their length. Machining the endwall 18 leaves termination ends 48 of the fibers 46c arranged within the complimentary space 42. In the illustrative embodiment, the termination ends 48 are exposed within the joint assembly 38 by machining but with proper connection of the joint assembly 38, the termination ends 48 would be unexposed to the environment. In some embodiments, the termination ends 48 may be coated and/or covered with matrix composite.

Similarly, fibers 46b extend generally vertically to define the airfoil 12 including the mass of the positive contour 40. However, the fibers 46b include a number of fibers 46d which have been machined to remove portions to form the final shape of the positive contour 40. Radially inward (downward in FIG. 2) of the positive contour 40, the fibers 46b,c illustratively extend along the radial (vertical) extent of the body 14 of the airfoil 12. In this manner the fibers of the endwall 18 and airfoil 12 are arranged to define the joint assembly 38 with machined portions. Although in FIG. 2, both of the machined and formed constructions of the fibers are shown on either lateral side for descriptive purposes, in the illustrative embodiment, only one construction would be applied to the entire component. In some embodiments, one of the endwall 18 and the airfoil 12 may include one construction while the other of the end wall 18 and airfoil 12 may include another construction.

Figures 3A, 3B, 4:
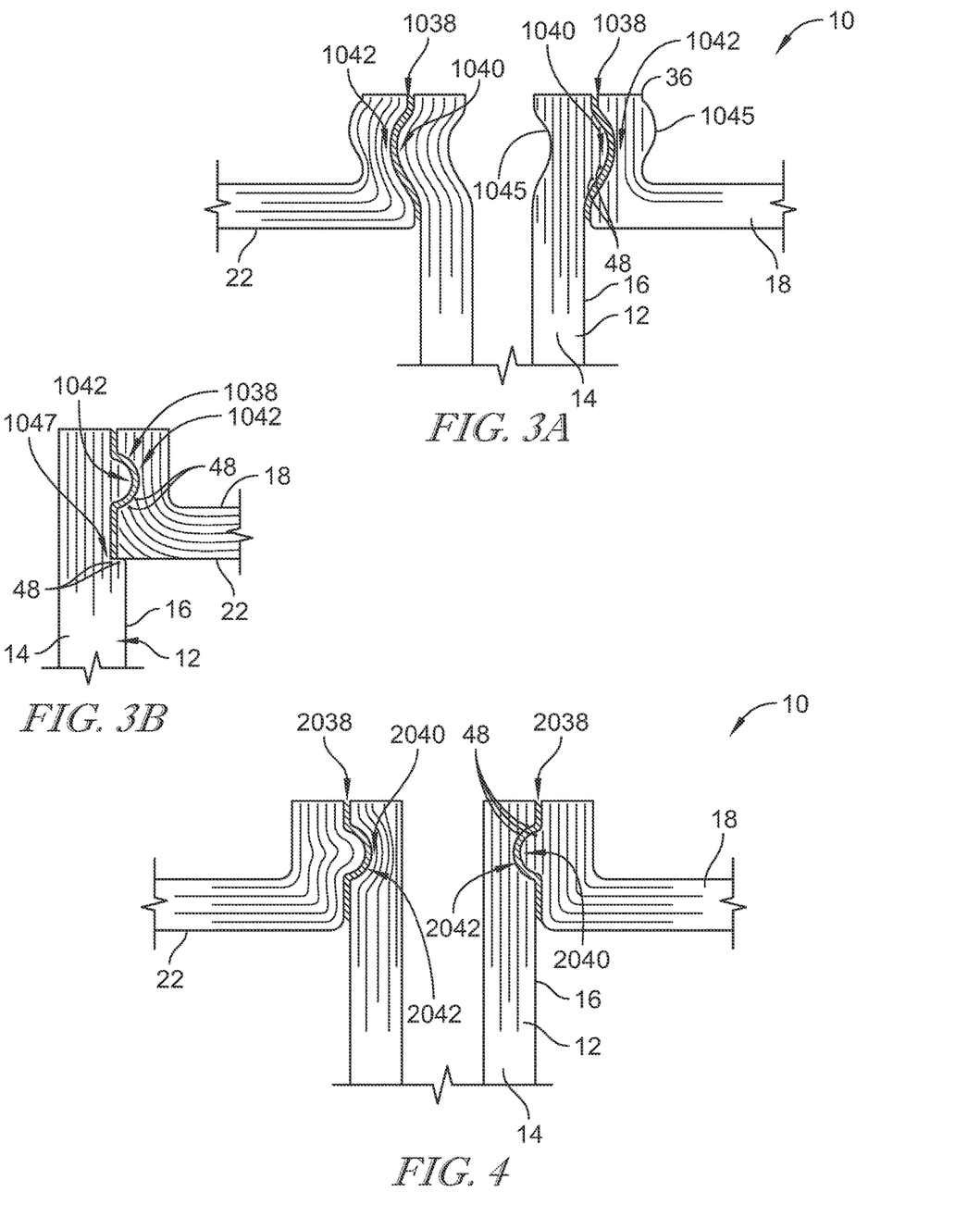
FIG. 3A is a cross-sectional view of another embodiment of the joint assembly of the airfoil assembly of FIG. 1 taken along the plane A-A showing that the positive contour is formed on the airfoil and the complimentary space is formed on the platform.
FIG. 3B is a closer detailed view of a portion of the cross-section of FIG. 3A showing that the airfoil has been machined to include a step for receiving the platform.
FIG. 4 is a cross-sectional view of another embodiment of the joint assembly of the airfoil assembly of FIG. 1 taken along the plane A-A showing that the positive contour is formed on the platform and the complimentary space is formed on the airfoil.

As shown in FIG. 3A, another embodiment of a joint assembly 1038 for securing the endwall 18 and the airfoil 12 is shown. The joint assembly 1038 is similar to the joint assembly 38, except the curvatures of the positive contour 1040 and the complimentary space 1042 are formed throughout the thickness of their components to reduce excess material. The fiber constructions on the left and right hand side of FIG. 3A correspond to the formed and machined constructions as discussed above regarding FIG. 2. Notably, on the right hand side, the outer (right hand) surface 1045 of the rim 36 and the inner (left hand) surface 1045 of the airfoil 12 are illustratively machined to remove additional material, although in some embodiments one or more of the surfaces 1045 may be left unmachined as a flat surface to avoid reducing the material integrity at their locations. As shown in FIG. 3B, a step 1047 is illustratively formed by the airfoil body 14 for receiving an inner corner of the endwall 18.

Referring now to FIG. 4, still another embodiment of a joint assembly 2038 of the airfoil assembly 10 is shown. The joint assembly 2038 is similar to the joint assemblies 38, 1038, yet, the positive contour 2040 is formed on the rim 36 of the endwall 18, and the complimentary space 2042 is formed on the airfoil 12. The fiber constructions of joint assembly 2038 as shown in the left hand and right hand side of FIG. 4 correspond with the formed and machined constructions, respectively, as discussed above. For example, the termination ends 48 of the machined fibers are arranged within the complimentary space 2042.

Figure 5:
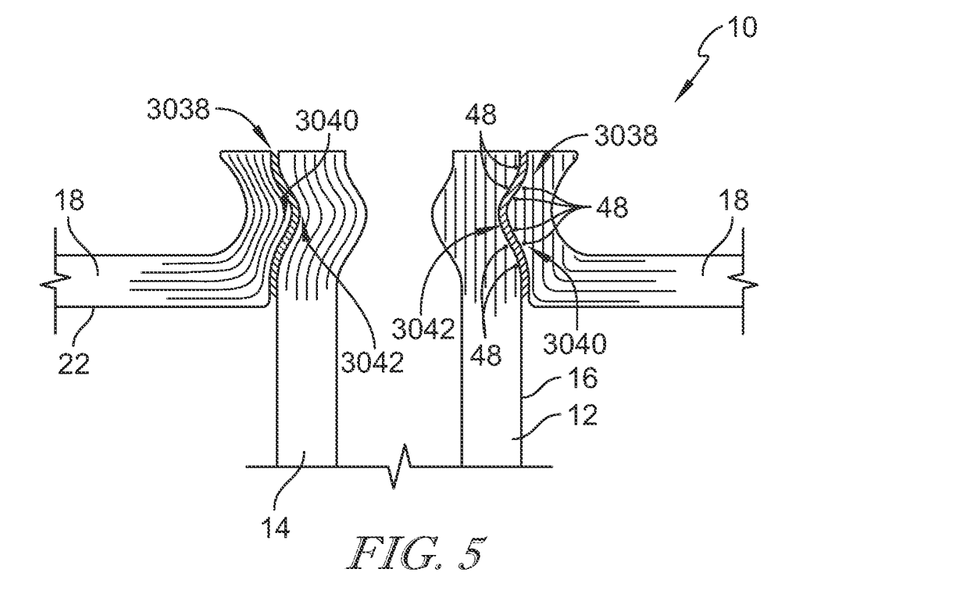
FIG. 5 is a cross-sectional view of another embodiment of the joint assembly of the airfoil assembly of FIG. 1 taken along the plane A-A.

Referring to FIG. 5, still another embodiment of a joint assembly 3038 of the airfoil assembly 10 is shown that is similar to the joint assemblies 38, 1038, 2038. Like the embodiment of FIG. 4, the positive contour 3040 is formed on the endwall 18 and the complimentary space is formed on the airfoil 12. Yet, like the embodiment of FIG. 3, the curvatures of the positive contour 3040 and the complimentary space 3042 are formed throughout the thickness of their components to reduce excess material. The same variety of fiber constructions discussed above apply to the embodiment of FIG. 5. For example, the termination ends 48 of the machined fibers are arranged within the complimentary space 3042.

Figure 6:
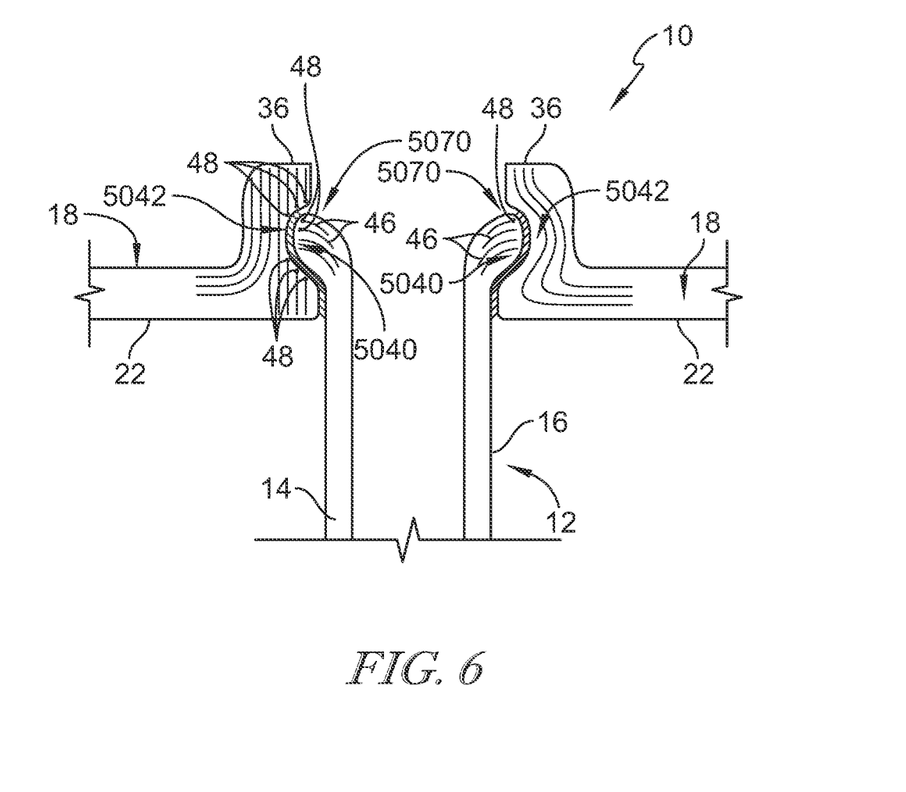
FIG. 6 is a cross-sectional view of another embodiment of the joint assembly of the airfoil assembly of FIG. 1 taken along the plane A-A showing that the positive contour is formed by a flare of the radially outer tip of the airfoil.

Referring now to FIG. 6, another embodiment of a joint assembly 5038 of the airfoil assembly 10 is shown having the positive contour 5040 formed on the airfoil 12 at a radially outer tip 5070 of the airfoil body 14. The positive contour 5040 is illustratively formed as a flared portion of the wall of the airfoil body 14 that projects laterally outward relative to the airfoil surface 16. Flaring of the airfoil body 14 at the outer tip 5070 is illustratively achieve by contour of the fibers 46 and no machining is required; however, in some embodiments, machining may be applied to provide close fitting tolerances between the positive contour 5040 and the complimentary space 5042. On the left side of FIG. 6, a construction of the endwall 18 is shown having the complimentary space 5042 machined therein, while on the right side of FIG. 6 the complimentary space 5042 is shown as formed construction, similar to the fiber constructions discussed above. In the illustrative embodiment, flaring the wall of the airfoil 12 does not require cutting the fibers for layup.

Figure 7:
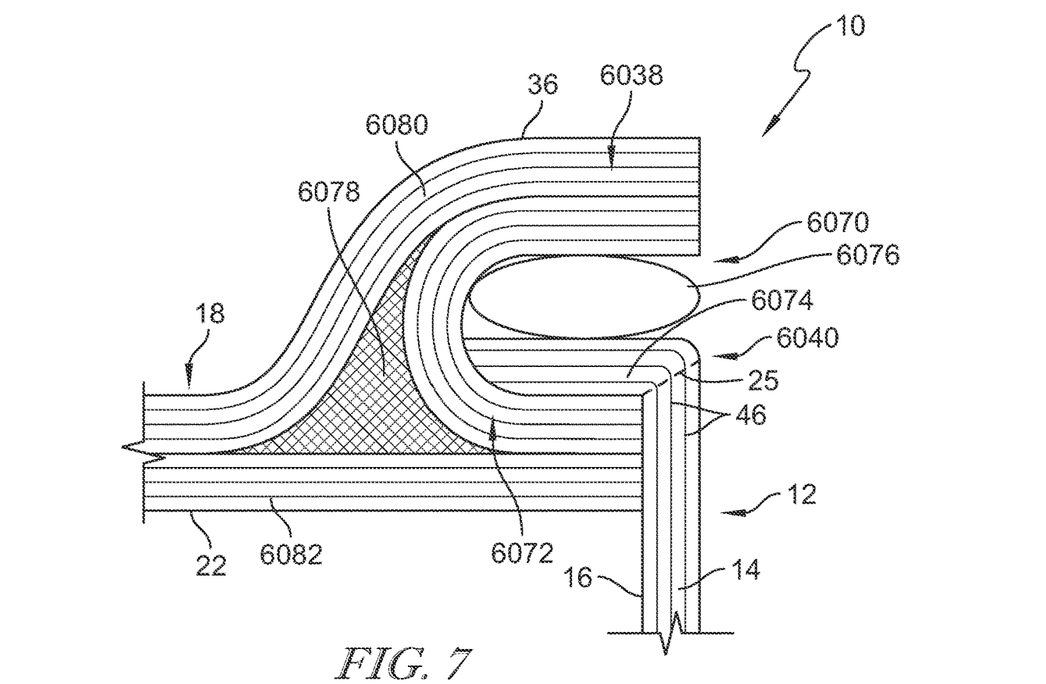
FIG. 7 is a cross-sectional view of a portion of another embodiment of the joint assembly of the airfoil assembly of FIG. 1 taken along the plane A-A showing that the platform includes a U-shaped reinforcement brace defining the complimentary space and the positive contour is formed by a stackup of a portion of the airfoil and an additive portion, and showing that the airfoil is darted to allow the portion to be turned laterally outward for engagement with the platform.

Referring to FIG. 7, another embodiment of a joint assembly 6038 of the airfoil assembly 10 is shown including the positive contour 6040 formed on the airfoil 12 at a radially outer tip 6070 of the airfoil body 14, similar to the embodiment of FIG. 6. Unlike FIG. 6, the rim 36 of the endwall 18 includes a U-shaped reinforcement brace 6072 formed of plies of fiber that defines the complimentary space 6042. The positive contour 6040 is formed of a stackup of a portion 6074 of the airfoil body 14 and an additive portion 6076.

The portion 6074 of the airfoil body 14 is formed of the continuous fibers 46 of the airfoil body 14 turned laterally outward from the airfoil surface 16. The fibers 46 of the airfoil body 14 are darted to allow their lateral turn as indicated by the dashed line 25. In the illustrative embodiment, the portion 6074 is turned to have an angle of about 90 degree relative to the airfoil surface 16, but in some embodiments may be turned to have any angle suitable, for example, within the range of about 10 to about 100 degrees relative to the airfoil surface 16. The additive portion 6076 is illustratively formed of a braided tube of fibers extending circumferentially about the airfoil 12. A noodle fill 6078 (bunched fiber with matrix fill) is placed between upper 6080 and lower 6082 arms of the endwall 18 to support the brace 6072.

Figure 8:
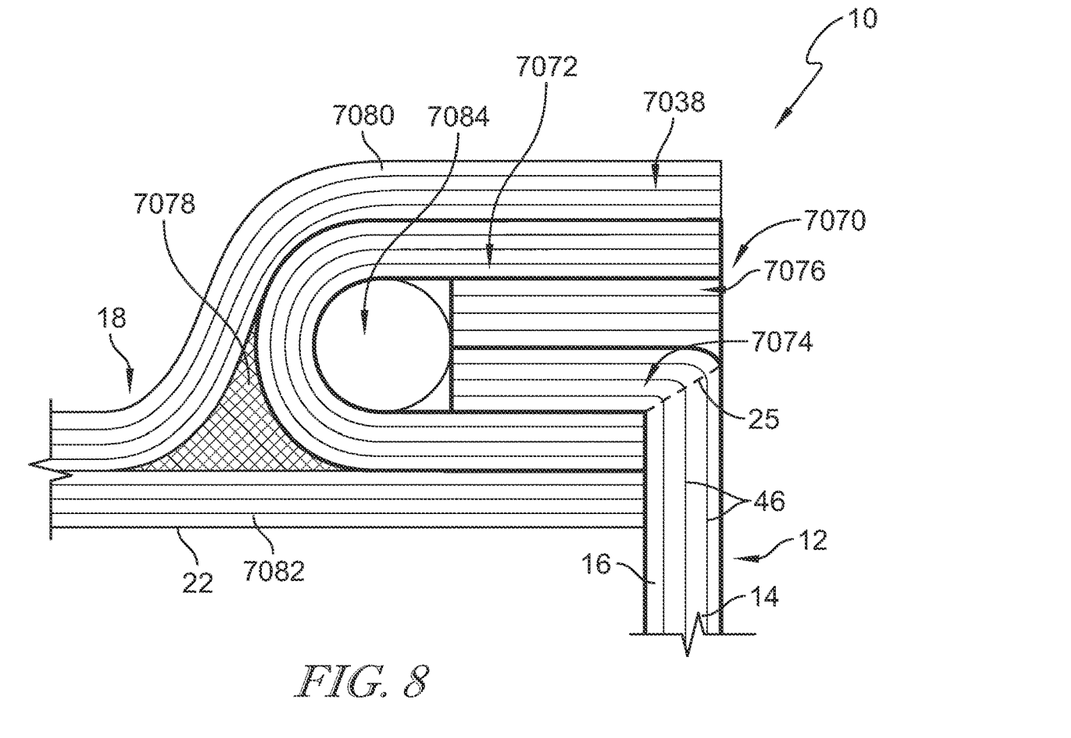
FIG. 8 is a cross-section view of a portion of another embodiment of the joint assembly of the airfoil assembly of FIG. 1 taken along the plane A-A showing that the additive portion is a number of backup plies and showing that a seal is provided between the reinforcement brace and the stackup.

Referring now to FIG. 8, another embodiment of a joint assembly 7038 of the airfoil assembly 10 is shown including the positive contour 7040 formed on the airfoil 12 at a radially outer tip 7070 of the airfoil body 14, similar to the embodiments of FIGS. 6 and 7. Unlike in FIG. 6, the additive portion 7076 of the stackup of the positive contour 7040 is formed of backup fibers 46 laid on top of the portion 7074. A seal 7084 is arranged within the complimentary space 7042 between the stackup and the U-shaped reinforcement brace 7072. The stackup arrangements permits close fit up of the joint assembly.

Figure 9:
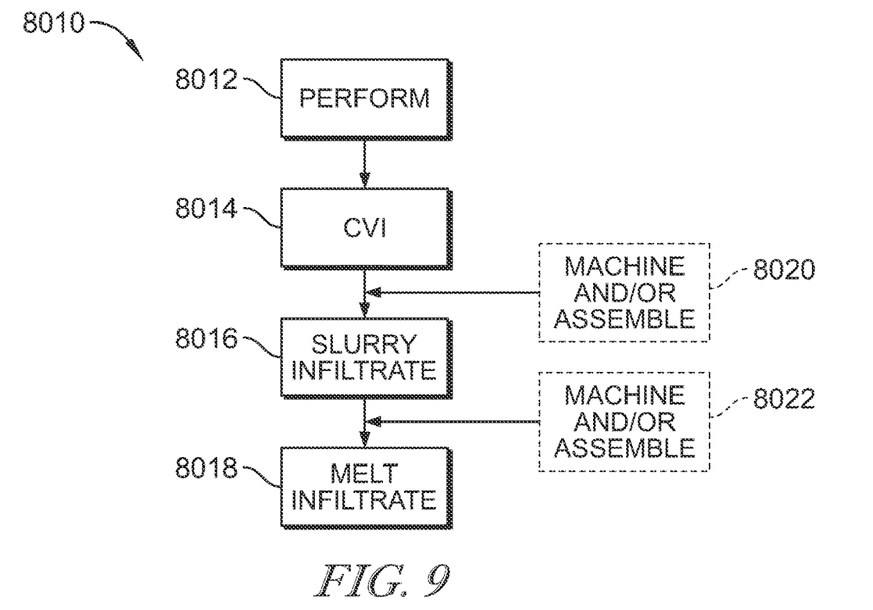
FIGS. 9-12 are a number of flow diagrams showing process steps for forming the airfoil assembly of FIG. 1 showing that machining can be perform at various stages.

Referring to FIGS. 9-12, a portion of a process of forming the airfoil assembly 10 is shown. Notably, certain machining steps disclosed hereinabove may require a certain amount of solidity or rigidity of the formation prior to enabling proper machining techniques. In FIG. 9, an exemplary process 8010 of forming the airfoil assembly 10 includes forming the preform 8012, applying chemical vapor infiltration (CVI) 8014, applying slurry infiltration 8016, and applying melt infiltration 8018. In embodiments requiring machining of joint assembly portions, the machining and/or partial assembly can be performed between the CVI 8014 and slurry infiltration 8016 boxes as indicated by box 8020, and/or can be performed between the slurry infiltration 8016 and melt infiltration 8018 boxes as indicated by 8022.

Figure 10:
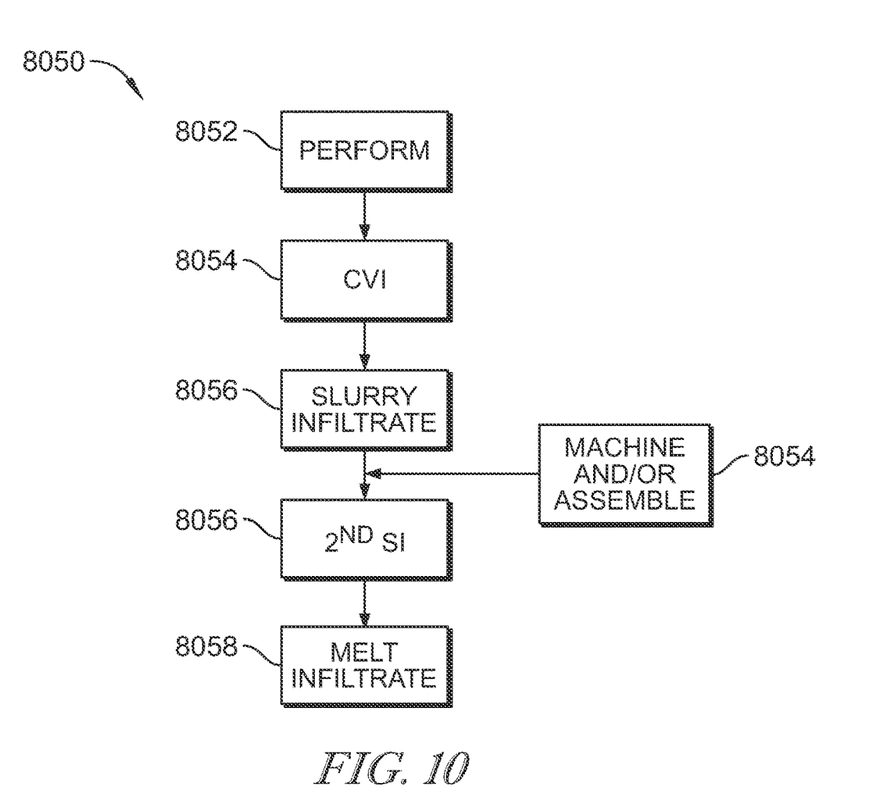

Referring to FIG. 10, another exemplary process 8050 is shown for forming the airfoil assembly 10 including forming the preform 8052, applying chemical vapor infiltration (CVI) 8054, applying slurry infiltration 8056, applying a secondary slurry infiltration, and applying melt infiltration 8058. In embodiments requiring machining of joint assembly portions, the machining and/or partial assembly can be performed after slurry infiltration and before the secondary slurry infiltration as indicated by box 8054.

Figure 11:
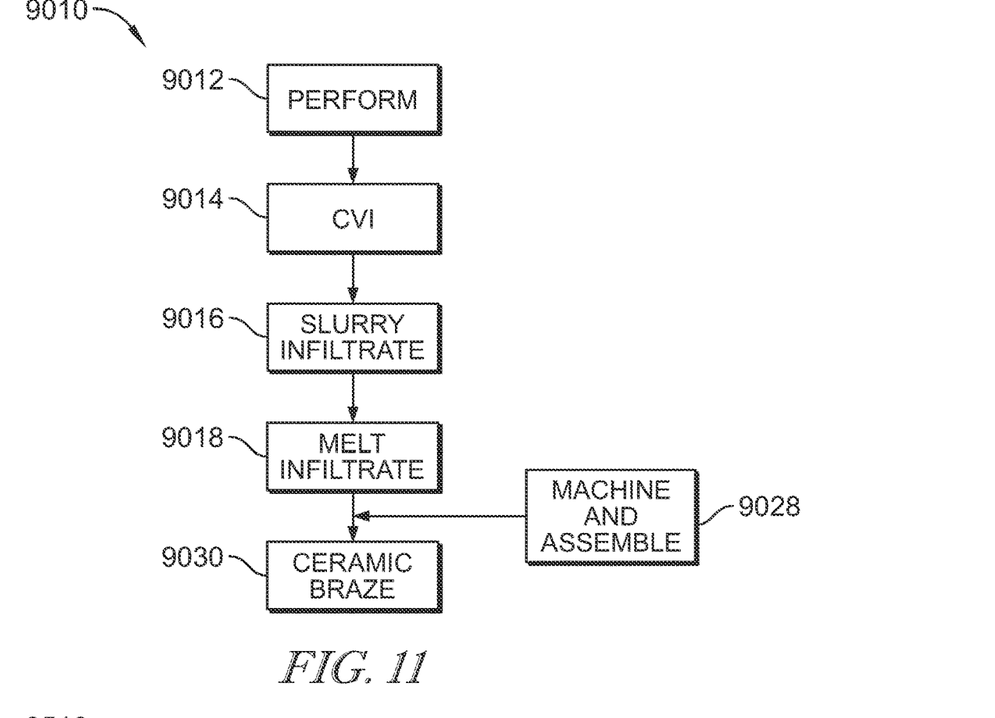

Referring to FIG. 11, yet another exemplary process 9010 is shown for forming the airfoil assembly 10 including forming the preform 9012, applying chemical vapor infiltration (CVI) 9014, applying slurry infiltration 9016, applying melt infiltration 9018, and applying ceramic braze 9030. In embodiments requiring machining of joint assembly portions, the machining and/or partial assembly can be performed after melt infiltration and before ceramic braze as indicated by box 9028.

Figure 12:
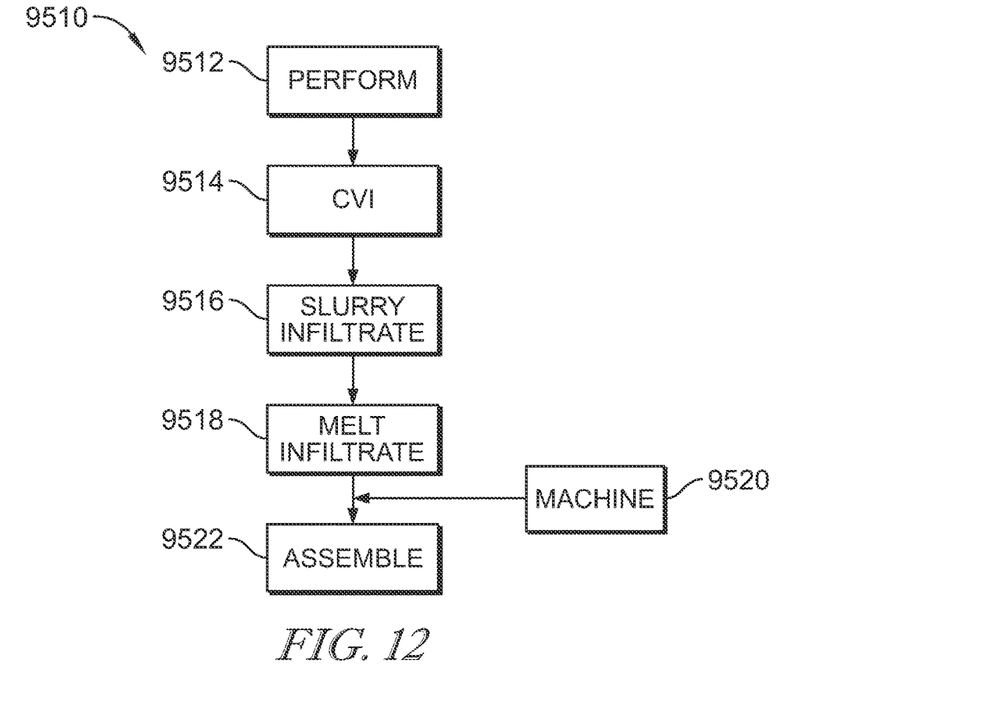

Referring to FIG. 12, yet another exemplary process 9510 is shown for forming the airfoil assembly 10 including forming the preform 9512, applying chemical vapor infiltration (CVI) 9514, applying slurry infiltration 9516, applying melt infiltration 9518, and assembling 9522 the airfoil 12 and endwall 18. In embodiments requiring machining of joint assembly portions, the machining can be performed after melt infiltration and before assembly as indicated by box 9520.

Figure 13:
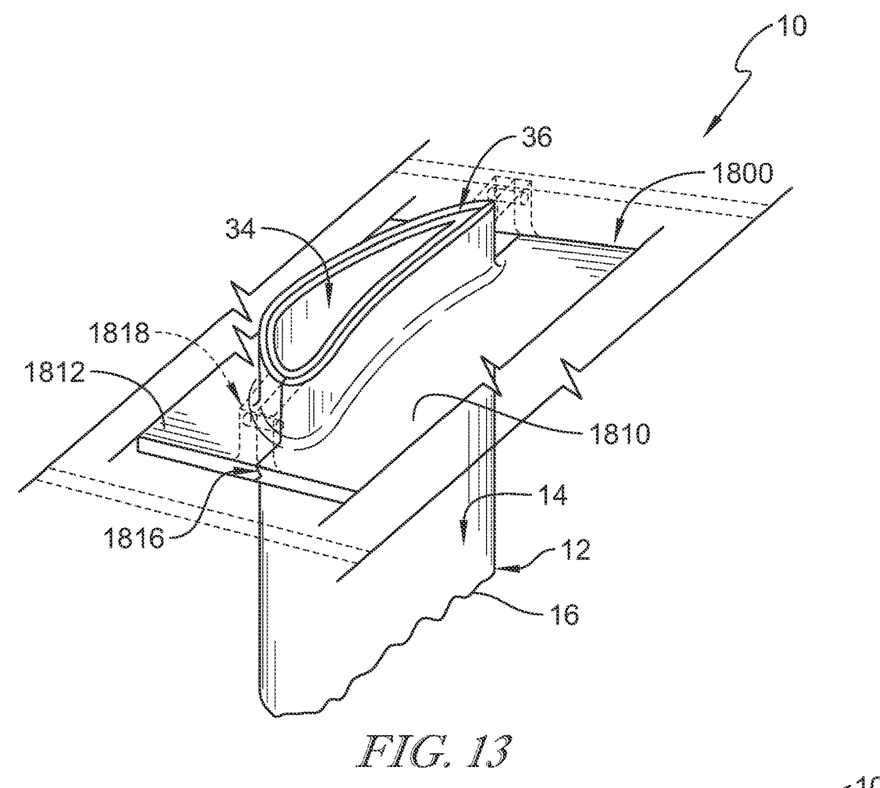
FIG. 13 is a perspective view of a portion of the airfoil assembly of FIG. 1 showing that the platform may be formed as a split assembly for installation.

In the illustrative embodiment as shown in FIG. 13, another embodiment of an endwall 1800 of the airfoil assembly 10 is shown secured with the airfoil 12 by the joint assembly and adapted for use in a gas turbine engine. The endwall 1800 includes the receiving hole 34 defined by the rim 36, but unlike the endwall 18, the endwall 1800 is split along the longitudinal length (left front to right rear in FIG. 13) into a first section 1810 and a second section 1812. The first and second sections 1810, 1812 are joined together at an intersection 1816 that illustratively extends along the longitudinal length of the endwall 1800 and through the rim 36 and receiving hole 34. The intersection 1816 is illustratively formed by complimentary faces of the sections 1810, 1812, embodied as a v-shaped positive and negative contour as shown in FIG. 13. The outer edges of the endwall 1800 can be captured via mechanical retainer such as a periphery clip, whether single or multi-piece.

Each of the sections 1810, 1812 illustratively includes an attachment flange 1818 having forward and aft portions. The flanges 1818 extend radially outward (upward in FIG. 13) from the base of the endwall 1800 and are secured together by mechanical pinning to secured the sections 1810, 1812 together. In some embodiments, any suitable joining may be included such as mechanical fastening, bonding, sealing, and/or combinations thereof.

Figure 14:
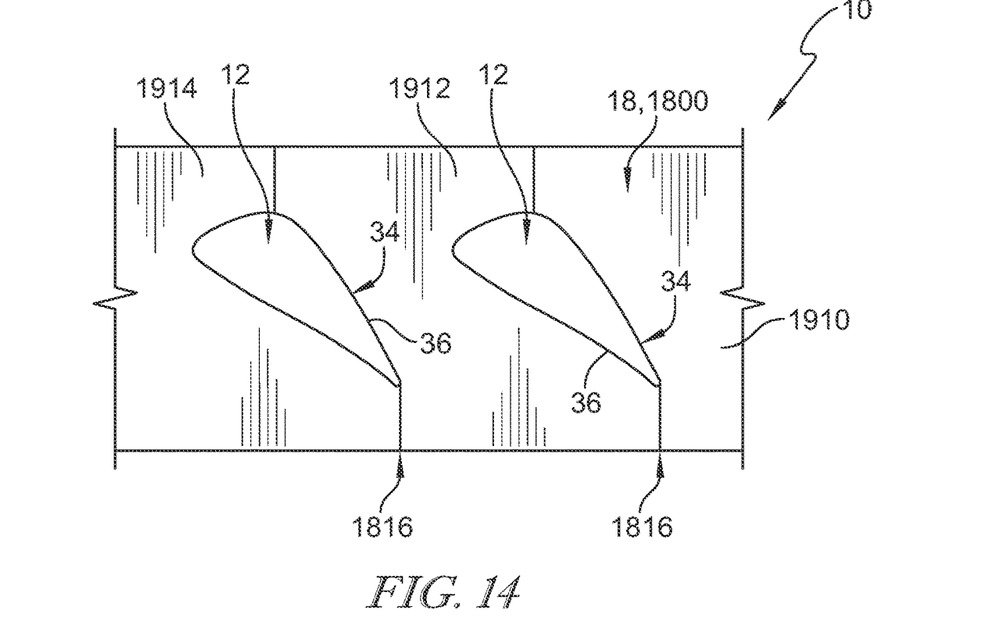
FIG. 14 is a radial view of another embodiment of the airfoil assembly of FIG. 1 formed as a doublet and showing that the platform may include three sections.

Referring to FIG. 14, optionally and in addition to the disclosure regarding the endwall 1800, the airfoil assembly 10 can be formed as a doublet having two airfoils 12 assembled together with three endwall sections 1910, 1912, 1914. The sections 1910, 1912, 1914 are illustratively joined to the neighboring section at an intersection 1816. The doublet arrangement can simplify installation and maintenance, and/or reduce the number of joints of the endwall in the assembly of the gas turbine engine.

Although the present disclosure often describes the joint assemblies and other features in terms of the endwalls 18, 1800 as a radially outer platform of the airfoil assembly 10, the features of the endwalls 18, 1800 can apply equally to the inner endwall 20 as a radially inner platform. Moreover, any suitable combination of the features of the embodiments, constructions, and/or examples provided herein are within the present disclosure, for example, one or more feature of one embodiment, construction, and/or example may be applied to the endwall 18, 1800 while one or more feature of another embodiment, construction, and/or example may be applied to the endwall 20.

The present disclosure includes ceramic matrix composite based components for use in a gas turbine engine, such as, the UltraFan® as marketed by Rolls-Royce (e.g., HP2NGV). The components may include an aerofoil, an inner platform and an outer platform. These elements could be manufactured individually and assembled together or could be fabricated as one-piece. If manufactured as one-piece then it could be advantageous to protrude the aerofoil element through the platform.

Due to the secondary air system architecture, the platforms may be loaded radially towards the gas path. This loading can impose significant stresses on the joint. Without any improvement, this stress may be imparted on the joint with no fiber reinforcement, meaning that the joint may rely on the matrix properties. This style of joint may not meet the life requirements associated with the gas turbine engine and/or its application (e.g., NGV) as damage may accumulate in the joint and the matrix material may act as a monolithic ceramic. Furthermore, environmental deterioration may reduce the capability of the material in this region. However, a reinforcement of the interface could increase the load carrying capability of joint and increase the toughness. This may improve the integrity of the joint and/or may reduce the impact of any environmental deterioration in this region.

The present disclosure includes formation of interfering geometry at the airfoil/endwall interface that can create a material clash resisting disassembly of the airfoil/endwall interface. This interfering geometry could resemble, but is not limited to: one or more positive features formed on the exterior of the airfoil, accepted by one or more negative features formed into the accepting aperture in the endwall; and/or, one or more positive features formed in the accepting aperture of the endwall, accepted by one or a plurality of negative features formed on the exterior of the airfoil.

A joint means can include any of the features of the joint assemblies disclosed herein. In some embodiments, the joint assembly may include bonding between the positive contour and the complimentary space, for example, co-processing, adhesive bonding, brazing such as diffusion brazing, other suitable bonding, and/or combinations thereof.

In some embodiments, the assembly can be achieved by mechanical assembly means, rather than formation of a single-piece assembly. In some embodiments, the endwall can be split at substantially the circumferential midpoint of the endwall where it coincides at the leading and trailing edge of the airfoil. The mechanical means of assembly can be exemplified via either a clip that surrounds the endwall and provides clamping force in the plane of the endwall to retain the assembly, and/or via mating tabs extending from the outward face of the endwall halves that support features necessary to provide means of attachment via a conventional mechanical fastener.

As previously mentioned, the airfoil assembly 10 may be formed of a ceramic-matrix composite (CMC) material. CMC materials can assist in reducing the weight of the assembly while providing good resistance to high temperatures of the flows passed over the airfoil assembly 10. The airfoil and endwalls illustratively comprise silicon-carbide reinforcements suspended in silicon-carbide matrix material, although other suitable CMC materials may be applied. In other embodiments, other reinforcements and other ceramic-containing matrix materials may be included in the airfoil assembly 10. In some embodiments, a noodle fill can be applied in the formation constructions to form the positive contour, for example, the noodle fill applied in a subsurface fill region interior to a number of exterior reinforcement plies defining the outer shape of the positive contour.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An airfoil assembly of a gas turbine engine, the assembly comprising:
   a vane including a body formed to have an airfoil surface for passage of pressurized flow through the gas turbine engine and an outer tip located at a radially outward end of the body and defining a terminating end of the vane, the body formed of a number of fibers;
   a platform defining a flow path surface for guiding pressurized flow through the gas turbine engine, the platform extending circumferentially from a radial end of the vane relative to the gas turbine engine; and
   a joint assembly securing the vane with the platform, the joint assembly including a positive contour formed by a flared portion of the outer tip of the vane and captured within a complimentary space in the platform,
   wherein the positive contour is formed by all of the number of fibers that each extend radially then bend outward to form the flared portion of the outer tip of the vane and wherein all of the number of fibers terminate at a termination end arranged within the opening of the complimentary space.

2. The airfoil assembly of claim 1, wherein the termination end of each fiber is arranged laterally outward of the airfoil surface for arrangement within the complimentary space.

3. The airfoil assembly of claim 2, wherein the complimentary space is formed by a number of plies of fibers arranged in a U-shape.

4. The airfoil assembly of claim 3, wherein a seal is arranged between the outer tip of the vane and the complimentary space.

5. The airfoil assembly of claim 3, wherein an additive portion of fibers is located in the complimentary space radially outward of the positive contour.

6. The airfoil assembly of claim 5, wherein the additive portion is formed of backup fibers that are laterally arranged and laid on top of the positive contour.

7. The airfoil assembly of claim 1, wherein at least one of the number of fibers is continuous between the body and the outer tip, and the at least one of the number of the fibers bends laterally outward from the airfoil surface at an intersection between a section of the fiber forming the positive contour and a remainder of the at least one fiber forming the body.

8. The airfoil assembly of claim 7, wherein the section of the fiber forming the positive contour extends laterally outward at angle in the range of 15 to 95 degrees relative to the airfoil surface near the intersection.

9. An airfoil assembly of a gas turbine engine, the assembly comprising:
   an airfoil including a body formed to have an airfoil surface for passage of pressurized flow through the gas turbine engine and an outer tip located at a radially outward end of the body to define a terminating end of the airfoil, the body formed of a number of fibers;
   a platform defining a flow path surface for guiding pressurized flow through the gas turbine engine, the platform extending circumferentially from a radial end of the airfoil relative to the gas turbine engine; and
   joint means for securing the airfoil with the platform to guide pressurized flow through the gas turbine engine, wherein the joint means includes a positive contour formed by all of the number of fibers to form a flared portion of the outer tip of the vane located in a complementary space in the platform.

10. The airfoil assembly of claim 9, wherein the positive contour is formed of a number of fibers each terminating at a termination end arranged within the complimentary space to form the flared portion of the outer tip of the vane.

11. The airfoil assembly of claim 10, wherein the complementary space is formed by a number of plies of fibers arranged in a U-shape.

12. The airfoil assembly of claim 11, wherein a seal is arranged between the outer tip of the vane and the complementary space.

13. The airfoil assembly of claim 11, wherein an additive portion of fibers is located in the complementary space radially outward of the positive contour.

14. The airfoil assembly of claim 10, wherein the termination end of at least one of the number of fibers is arranged laterally outward of the airfoil surface for arrangement within the complimentary space.

15. The airfoil assembly of claim 10, wherein at least one of the number of fibers is continuous between the body and the outer tip, and the at least one of the number of the fibers bends laterally outward from the airfoil surface at an intersection between a section of the fiber forming the positive contour and a remainder of the at least one fiber forming the body.

16. The airfoil assembly of claim 15, wherein the section of the fiber forming the positive contour extends laterally outward at angle in the range of 15 to 95 degrees relative to the airfoil surface near the intersection.

17. A method of assembling a CMC airfoil of a gas turbine engine, the method comprising:
   forming a vane from a number of fibers, the vane having an outer tip and a body, the body having an airfoil surface, and the outer tip located at a radially outer terminating end of the vane and arranged to extend laterally outward from the airfoil surface to form a positive contour that flares outward away from the airfoil surface, and all of the number of fibers extend continuously from the body to the outer tip to form the positive contour,
   forming a platform defining a flow path surface, the platform having a receiving hole and a radially extending wall that forms a complementary space for receiving the positive contour,
   inserting the vane through the receiving hole in the platform,
   arranging the positive contour of the outer tip for insertion into the complementary space in the platform,
   arranging termination ends of a number of fibers of the positive contour of the outer tip within the complimentary space of the platform.

18. The method of claim 17, wherein the termination ends are arranged laterally outward at angle in the range of 15 to 95 degrees relative to the airfoil surface.

* * * * *